United States Statutory Invention Registration [19]

[11] Reg. Number: H917

Gergen et al. [43] Published: May 7, 1991

[54] POLYMER BLEND

[75] Inventors: William P. Gergen, Houston, Tex.; Robert G. Lutz, Santa Rosa, Calif.; Richard L. Danforth, Missouri City, Tex.

[73] Assignee: Shell Oil Company, Houston, Tex.

[21] Appl. No.: 386,177

[22] Filed: Jul. 28, 1989

[51] Int. Cl.[5] ..... C08G 63/48; C08F 283/00
[52] U.S. Cl. ..... 525/64; 525/539
[58] Field of Search ..... 525/64, 539

[56] References Cited

U.S. PATENT DOCUMENTS

| | | | |
|---|---|---|---|
| 2,495,286 | 1/1950 | Brubaker | 260/63 |
| 3,447,918 | 6/1969 | Amick | 44/70 |
| 3,694,412 | 9/1972 | Nozaki | 260/63 |
| 3,855,251 | 12/1974 | Cahill | 260/346.8 R |
| 4,325,876 | 4/1982 | Chafetz et al. | 260/346.74 |
| 4,388,471 | 6/1983 | Wollenberg | 562/595 |
| 4,599,433 | 7/1986 | Bronstert et al. | 549/255 |
| 4,857,570 | 8/1989 | Smutny | 524/112 |

FOREIGN PATENT DOCUMENTS

| | | |
|---|---|---|
| 0121965 | 3/1984 | European Pat. Off. . |
| 0181014 | 5/1986 | European Pat. Off. . |
| 0213671 | 3/1987 | European Pat. Off. . |
| 0257663 | 3/1988 | European Pat. Off. . |
| 1081304 | 8/1967 | United Kingdom . |

*Primary Examiner*—John S. Maples
*Assistant Examiner*—Shean C. Wu

[57] ABSTRACT

Blends of (a) a linear alternating polymer of carbon monoxide and at least one ethylenically unsaturated hydrocarbon and (b) a maleated polyolefin polymer exhibit improved properties of thermal stability, impact resistance as better processability.

14 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYMER BLEND

FIELD OF THE INVENTION

This invention relates to an improved polymer blend comprising predominantly a linear alternating polymer of carbon monoxide and at least one ethylenically unsaturated hydrocarbon. More particularly the invention relates to blends of the linear alternating polymer with a maleated polyolefin polymer.

BACKGROUND OF THE INVENTION

The class of polymers of carbon monoxide and olefin(s) has been known for some time. Brubaker, U.S. Pat. No. 2,495,286 produced such polymers of relatively low carbon monoxide content in the presence of free radical initiators, e.g., peroxy compounds. U.K. 1,081,304 produced similar materials of higher carbon monoxide content in the presence of trialkylphosphine complexes of palladium salts as catalyst. Nozaki extended this process to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, e.g., carbon monoxide and ethylene or carbon monoxide, ethylene and propylene, has become of greater interest in part because of the greater availability of the polymers in quantity. These polymers, often referred to as polyketones or polyketone polymers, have been shown to be of the repeating formula —CO—(—A—)— wherein A is the moiety of unsaturated hydrocarbon polymerized through the ethylenic unsaturation. For example, when the unsaturated hydrocarbon is ethylene, the polyketone polymer is represented by the repeating formula $—CO—(—CH_2—CH_2—)—$. The general process for the more recent production of polyketone polymer is illustrated by a number of published European patent applications including 121,965, 181,014, 213,671 and 257,663. The process typically involves a catalyst composition formed from a compound of a Group VIII metal selected from palladium, nickel or cobalt, the anion of a strong non-hydrohalogenic acid and a bidentate ligand of phosphorus, arsenic or antimony.

The resulting polyketone polymers are relatively high molecular weight thermoplastics having utility in the production of shaped articles such as containers and automotive parts which are produced by processing the polymer according to known methods such as injection molding and extrusion. For some particular applications it has been found desirable to have properties for the polymeric composition which are somewhat different from those of the polyketone polymer. It would be of advantage to retain the desirable properties of the polyketone polymers and yet improve other properties. These advantages are often obtained through the provision of a polymer blend.

SUMMARY OF THE INVENTION

The present invention contemplates the provision of blends of linear alternating polymers of carbon monoxide and at least one ethylenically unsaturated hydrocarbon. More particularly, according to the invention, there are provided blends of the linear alternating polymer with a maleated polyolefin polymer. Such blends exhibit improved melt stability, impact resistance and tensile strength as well as better processability when compared with the unblended linear alternating polymer.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, butylene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, m-propylstyrene and p-ethylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

The structure of the polyketone polymers is that of a linear alternating polymer of carbon monoxide and unsaturated hydrocarbon and the polymer will contain substantially one molecule of carbon monoxide for each molecule of unsaturated hydrocarbon. When terpolymers of carbon monoxide, ethylene and a second hydrocarbon are employed, there will be at least about units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain is therefore represented by the repeating formula $$\{CH(CH_2—CH_2)\}_x[CO(G)]_y$$

wherein G is the moiety of the second hydrocarbon polymerized through the ethylenic unsaturation. The $—CO(CH_2—CH_2)—$ units and the $—CO(G)—$ units are found randomly throughout the polymer chain and the ratio of y:x is no more than about 0.5. In the modification of the invention wherein copolymer of carbon monoxide and ethylene is employed as the blend component, there will be no second hydrocarbon present and the polyketone polymer will be represented by the above formula wherein y is 0. When y is other than 0, i.e., terpolymers are employed, the ratio of y:x is preferably from about 0.01 to about 0.1 The end groups or "caps" of the polymer chain will depend on what materials are present during the production of the polymer and whether and how the polymer has been purified. The precise properties of the polymers will not depend upon the end groups to any considerable extent so that the polymer is fairly represented by the above formula for the polymeric chain. Of particular interest are the polyketone polymers of number average molecular weight from about 1000 to about 200,000, particularly those polymers of number average molecular weight from about 20,000 to about 90,000, as determined by gel permeation chromatography. The physical properties of such polymers will depend in part on the molecular weight, whether the polymer is a copolymer or a terpolymer and in the case of terpolymers the nature of and the proportion of the second hydrocarbon. Typical melting points for such polymers are from about 175° C. to about 300° C., more frequently from about 210° C. to about 270° C. The polymers will have a limiting viscosity number (LVN), when measured in a standard capillary viscosity measuring device in m-cresol at 60° C., of from about 0.5 to about 10, preferably from about 0.8 to about 4.

A method of producing the polyketone polymers which is now becoming conventional is to contact the carbon monoxide and unsaturated hydrocarbon(s) in the presence of a catalyst composition formed from a palladium compound, the anion of a non-hydrohalogenic acid having a pKa below about 6 and a bidentate ligand of phosphorus. The scope of the process for polyketone production is extensive but, without wishing to be limited, a preferred palladium compound is a palladium carboxylate, particularly palladium acetate, a preferred anion is the anion of triflouroacetic acid or p-toluenesulfonic acid, and the preferred phosphorus bidentate ligand is 1,3-bis(diphenylphosphino)propane or 1,3-bis[di(2-methoxyphenyl)phosphino]propane. Such a process is illustrated by copending U.S. patent application Ser. No. 930,468, filed Nov. 14, 1986.

Polymerization is conducted in the gas phase in the substantial absence of diluent or in a liquid phase in the presence of an inert diluent such as an alkanol e.g., methanol or ethanol. The reactants are contacted under polymerization conditions in the presence of the catalyst composition by conventional methods such as shaking or stirring in a reaction vessel. Suitable reaction temp -atures are from about 20° C. to about 150° C., preferably from 50° C. to about 135° C. Typical reaction pressures are from about 1 bar to about 200 bar, more typically from about 10 bar to about 100 bar. Subsequent to reaction the polymer is recovered by conventional procedures such as filtration or decantation. The polymer may contain residues of the catalyst composition which are removed, if desired, by treatment of the polymer product with a solvent or extraction agent which is selective for the residues.

The minor component of the blends of the invention is a maleated polyolefin polymer. By maleated polyolefin polymer is meant a polymeric adduct of a polyolefin polymer and a maleic acid compound. These adducts, on occasion, are also referred to as alkenyl succinic anhydrides when the maleic acid compound is maleic anhydride. Although a variety of polyolefins, when maleated, are useful in the blends of the invention, the preferred maleated polyolefin polymers are those hydrocarbon polyolefins wherein the olefin has up to 4 carbon atoms inclusive. Thus, suitable polyolefin precursors of the blend component include polymers of ethylene, propylene, any of the isomeric butenes, e.g., 1-butene, 2-butene or isobutylene, or mixtures thereof. In part because of the nature of the maleation process to be applied to the polyolefin polymer, the preferred polyolefin polymer precursors of the blend component are polyolefin polymers with some degree of branching in the polymer chain. Preferred polyolefin polymers are polypropylene, polybutene or copolymers of propylene or butylene with up to about 12% by mol of ethylene. Particularly preferred polyolefin polymers are polypropylene and polybutene, especially polyisobutene. Such polyolefin polymers are all well known in the art as are methods for the production of such polyolefin polymers. The polyolefin polymers most useful as precursors of the maleated polyolefin polymer blend component will typically have a molecular weight from about 300 to about 3,500, more often from about 450 to about 1,700. Such polyolefin polymers are commercially available and are marketed, for example, by Mitsui.

To obtain the maleated polyolefin polymer, the polyolefin polymer is reacted with a maleic acid compound. Illustrative of such maleic acid compounds are maleic acid, maleic anhydride, fumaric acid, methylmaleic acid, dimethylmaleic acid and methylmaleic anhydride. Of these, maleic anhydride is the preferred maleic acid compound. The maleation of the polyolefin polymer is conducted by mixing the polyolefin polymer and the maleic acid compound and maintaining the mixture at an elevated temperature, e.g. up to about 300° C., generally in the presence of a catalyst or a free radical initiator. Such methods are also known in the art. In terms of the preferred maleated polybutene polymer, Cahill, U.S. Pat. No. 3,855,251, produces maleated polybutene polymer of particular substitution in the presence of a alkylbenzenesulfonic acid as catalyst. Amick, U.S. Pat. No. 3,447,918, reacts maleic anhydride and polybutylene polymer at elevated temperature in the apparent absence of catalyst or initiator. Chafety et al, U.S. Pat. No. 4,325,876, show a method for maleating polybutene polymer by contacting the polybutene polymer and maleic anhydride in the presence of an oxygen-containing gas, e.g., air. Such methods are broadly useful for the production of the maleated polybutene polymers (as well as the other maleated polymers which are suitable or use) as well as the other maleated polymers which are suitable for use as the blend component in the invention. Without wishing to be bound by any particular theory, it appears likely that the maleic acid compound reacts at a carbon atom allylic to residual unsaturation of the polyolefin polymer or through the abstraction of hydrogen substituents from tertiary carbon atoms of the polymer. In any event, reaction takes place to effectively graft maleic acid compound moieties onto the backbone or pendant side chains of the polyolefin polymer. The amount of maleic acid compound which attaches to the polymeric chain will depend on the nature of the reaction conditions, particularly the temperature, as well as the ratio of maleic acid compound to polyolefin polymer employed as the reaction mixture, In general, sufficient maleic acid compound is reacted with the polyolefin polymer so that the maleated polyolefin polymer will contain from about 0.1% to about 20% by weight, based on total maleated polyolefin polymer, of maleic acid compound moieties. Preferred maleated polyolefin polymers have from about 1% to about 5% by weight of maleic acid compound moieties on the same basis.

The blends of the invention comprise a mixture of a major proportion of the polyketone polymer and a minor proportion of the maleated polyolefin polymer. The precise proportion of the maleated polyolefin polymer in the blends is not critical although quantities of maleated polyolefin polymer from about 0.5% by weight to about 40% by weight, based on total blend, are satisfactory. Preferred quantities of maleated polyolefin polymer are from about 1% by weight to about 20% by weight on the same basis. The method of producing the blend of the polyketone polymer and the maleated polyolefin polymer is not material so long as a relatively uniform mixture of the maleated polyolefin polymer throughout the polyketone polymer is obtained. The polyketone/maleated polyolefin polymer blend is a non-miscible blend with the maleated polyolefin polymer existing as a discrete phase in the polyketone matrix having a phase size from about 0.5 micron to about 4.0 micron, but more typically in the range of from about 1.0 micron to about 2.5 micron. The blend will therefore not be homogeneous, but good properties are obtained when the distribution of the maleated polyolefin polymer is substantially uniform throughout the polyketone polymer matrix. The method of blending the component is that which is conventional for blending non-miscible polymeric materials. In one modification a mixture of the components in particulate form is passed through an extruder operating at elevated temperature and a high RPM to produce the blend as an extrudate. In an alternate modification, the components are blended in a mixing device which exhibits high shear.

The blends of the invention may also include conventional additives such as antioxidants, stabilizers, fillers, fire resistant compounds, mold release agents and other materials which are added to increase the processability of the polymer components or improve the properties of the resulting blend. Such additives are added by conventional methods prior to, together with or subsequent to the blending of the polyketone and maleated polyolefin polymer components.

The blends of the invention are characterized by improved thermal stability and impact resistance as well as by better processability when compared to the polyketone polymer. The blends are therefore of particular utility where production of articles by processes involving molten polymers are employed or where the objects are likely to be subject to physical stress. As a general matter, the higher the LVN of a polyketone polymer the more difficult the processing of the polymer becomes by methods which involve molten polymer such as extrusion and injection molding. The blends of the invention, having a greater processability than the unblended polyketone polymer, are particularly useful with polyketone polymers having a relatively high LVN, e.g., from about 1.8 to about I5, especially from about 2.75 to about 4. The blends are processed by conventional techniques such as injection molding and extrusion into sheets, films, fibers and shaped articles which as useful in packaging applications as well as in the production of containers as for the food and drink industry or in the production of parts for automotive applications.

The invention is further illustrated by the following Illustrative Embodiments which should not be construed as limiting.

ILLUSTRATIVE EMBODIMENT I

A. A first terpolymer of carbon monoxide, ethylene and propylene (87/002) was produced by contacting the monomers in the presence of a catalyst composition formed from palladium acetate, trifluoroacetic acid and 1,3-bis(di(2-methoxyphenyl)phosphino)propane. This first terpolymer had a melting point of 220° C. and a LVN, measured in m-cresol at 60° C. of 1.3.

B. Employing substantially the same procedure, a second terpolymer of carbon monoxide, ethylene and propylene (87/006) was produced, also employing a catalyst formed from palladium acetate, trifluoroacetic acid and 1,3-bis(di(2-methoxyphenyl)phosphino) propane. This second terpolymer had a melting point of 221° C. and an LVN, measured in m-cresol at 60° C. of 1.83.

ILLUSTRATIVE EMBODIMENT II

Blends of the terpolymers of Illustrative Embodiment I with maleated polyisobutylene polymer were produced by passing the blend components, together with 0.3% by weight, based on total mixture, of AO 330, a hindered phenolic antioxidant, through a 30 mm Haake extruder operating at a temperature profile of 95° C.-200° C.-218° C. and 200 rpm under a nitrogen blanket with dried feed. The maleated polyisobutylene polymer was Shell PB 8010 cracked with Lupesol 101 to 33 melt index.

Prepared in this manner were a blend of 99%, by weight, of the terpolymer of Illustrative Embodiment I, part A, with 1% by weight of maleated polyisobutylene polymer (Sample IA), a blend of 90% by weight of the terpolymer of Illustrative Embodiment I, part B, with 10% by weight of the maleated polyisobutylene polymer (Sample IB1) and a blend of 99% by weight of the same terpolymer and 1% by weight of the maleated polyisobutylene polymer (Sample IB2). All samples extruded well and Samples IB1 and IB2 exhibited high melt strength.

The preparation of these blends is also utilized to compare the processability of the blends as a function of the reduction of torque required to process the blends because of the lubrication provided by the maleated polysobutylene polymer. The torque required for the extrusions depicted above is shown in Table I. The torque is proportional to extruder drive motor power, (amps) at a constant screw rpm.

TABLE I

| Sample | % Maleated Polyisobutylene | Torque Amps |
|---|---|---|
| IA1 | 1% | 8.5 |
| IB1 | 10% | 7.0 |
| IB2 | 1% | 11.0 |

The non-miscible character of the blends was shown by examination of a cold cut sample, stained with ruthenium tetroxide, under an electron microscope. The maleated polyisobutylene polymer was present as a discrete phase having a particle size of 1.5 micron.

ILLUSTRATIVE EMBODIMENT III

Notched bars of the blends of Illustrative Embodiment II were produced in an Arburg 2 injection molding machine operating at 400 rpm, a back pressure of 100 psi and a mold temperature of 140° F. Other conditions are shown in Table II.

TABLE II

| Sample | Injection Speed | Injection pressure, psi |
|---|---|---|
| IA | 4.0 | 350 |
| IB1 | 5.0 | 1200 |
| IB2 | 2.4 | 300 |

ILLUSTRATIVE EMBODIMENT IV

The bars prepared in Illustrative Embodiment III were tested to determine the notched Izod Impact strength of each bar. The test used was ASTM D-256. The results are shown in Table III.

TABLE III

| Sample | Izod Impact, ft. lbs/in | |
|---|---|---|
| | Room temp | −20° C. |
| IA | 2.31 | 1.06 |
| IB1 | 11.8 | 1.97 |
| IB2 | 5.85 | 1.45 |

ILLUSTRATIVE EMBODIMENT V

By a procedure similar to that of Illustrative Embodiment I, a terpolymer of carbon monoxide, ethylene and propylene was produced which had a melting point of 213° C. and an LVN, measured in m-cresol at 60° C., of 2.85 dl/g.

This polymer, and mixtures of this polymer with 1% by weight, 5% by weight and 10% by weight, based on total mixture, of a maleated polybutylene having 3% by weight, based on (total polymer, of maleic acid compound moieties, were passed through an extruder. The extruder employed was a Baker Perkins 15mm twin screw extruder operating in air at a temperature range of 235°-243° C. and at a maximum of 300 rpm. In each case, the required torque to process the sample and the back pressure were determined. The results are shown in Table IV. In this case the torque is proportional to the % Electrical load on the drive motor.

TABLE IV

| Sample | Torque, % Load | Back Pressure, psi |
|---|---|---|
| Polymer | 57 | 70-80 |
| Polymer + 1% | 45 | 50-60 |
| Polymer + 5% | 33 | 8-15 |
| Polymer + 10% | 25 | 0 |

ILLUSTRATIVE EMBODIMENT VI

The evaluation of Illustrative Embodiment V was repeated employing a terpolymer of carbon monoxide, ethylene and propylene which had a melting point of 235° C. and an LVN, measured in m-cresol at 60° C., of 3.95 dl/g. The temperature range of the extruder in this case was 227°-253° C. The results obtained during the extrusion are shown in Table V.

TABLE V

| Sample | Torque, % Load | Back Pressure, psi |
|---|---|---|
| Polymer | 48 | 7-15 |
| Polymer + 1% | 38 | 0-4 |
| Polymer + 5% | 35 | 0-4 |
| Polymer + 10% | 30 | 0-1 |

ILLUSTRATIVE EMBODIMENT VII

A terpolymer (56/016) of carbon monoxide, ethylene and propylene was produced by a procedure employing a catalyst composition formed from palladium acetate, p-toluenesulfonic acid and 1,3-bis(diphenylphosphino)-propane. The polymer had a melting point of 223° C. and a LVN, measured in m-cresol at 60° C. of 2.

Blends of the terpolymer and 0.4% by weight of a maleated polypropylene (Mitsui Petrochemicals QF500) were prepared by passing the blend components through a Brabender single screw extruder operating at 50 rpm with a temperature profile of 183° C.-204° C.-251° C. and a die temperature of 251° C. The extrusion was easily accomplished and the overall appearance of the extrudate was considered clean.

The thermal stability of the blend was examined in a differential scanning calorimeter in which a sample of the blend was heated to its melting point ($T_m$) and then cooled until the sample crystallized ($T_c$). The sample was then heated past its second melting point until the temperature reached 265° C. where the sample was maintained for 10 minutes. The sample was then cooled to its second crystallization temperature. The melting point was determined as the point at which the heat flow reached a maximum and the crystallization temperature as that point at which the heat flow reached a minimum. From the DSC data, it is also possible to determine the heat of melting (H) and the heat of crystallization (C) in cal/g.

The thermal stability is a measure of the difference between the first and second melting points, or the first and second crystallization temperatures, with the smaller differences reflecting greater thermal stability. The same relationship is true for the heats of melting and heats of crystallization. The results of the DSC experiments for the blend, and also for the terpolymer from which it was produced, are shown in Table IV.

TABLE VI

| Sample | $T_m1$ | $T_m2$ | $T_c1$ | $T_c2$ | $H_1$ | $H_2$ | $C_1$ | $C_2$ |
|---|---|---|---|---|---|---|---|---|
| terpolymer | 217 | 199 | 175 | 140 | 27.1 | 15.9 | 15.9 | 10.6 |
| blend | 218 | 209 | 188 | 178 | 23.9 | 23.5 | 19.7 | 13.8 |

What is claimed is:

1. A composition comprising a non-miscible blend of, as a major component, a linear alternating polymer of carbon monoxide and at least one ethylenically unsaturated hydrocarbon, and, as a minor component, a maleated polyolefin polymer.

2. The composition of claim 1 wherein the linear alternating polymer is represented by the repeating formula $$\text{-}[CO\text{-}(CH_2\text{-}CH_2)\text{-}]_x[CO\text{-}(G)\text{-}]_y$$

wherein G is the moiety of ethylenically unsaturated hydrocarbon of at least 3 carbon atoms polymerized through the ethylenic unsaturation and the ratio of y:x is no more than about 0.5.

3. The composition of claim 2 wherein the polyolefin polymer of the maleated polyolefin polymer is a polyolefin polymer wherein the olefin has up to 4 carbon atoms inclusive.

4. The composition of claim 3 wherein the maleated polyolefin polymer is present in a quantity from about 0.5% by weight to about 40% by weight based on total blend, said maleated polyolefin having from about 1% by weight to about 20% by weight, based on maleated polyolefin polymer, of maleic acid compound moieties.

5. The composition of claim 3 wherein y is zero.

6. The composition of claim 3 wherein G is a moiety of propylene.

7. The composition of claim 6 wherein the polyolefin polymer of the maleated polyolefin polymer is polypropylene, polybutene or copolymer of propylene or butene with up to about 12% by mol of ethylene.

8. The composition of claim 7 wherein the maleated polyolefin polymer is present in a quantity of from about 0.5% by weight to about 40% by weight, based on total blend.

9. The composition of claim 8 wherein the ratio of y:x is from about 0.01 to about 0.1.

10. The composition of claim 9 wherein the maleated polyolefin polymer has from about 0.1% by weight to about 20% by weight, based on maleated polyolefin polymer, of maleic acid compound moieties.

11. The composition of claim 1 wherein the maleated polyolefin polymer is maleated polypropylene.

12. The composition of claim 10 wherein the maleated polyolefin polymer is maleated polyisobutylene.

13. The composition of claim 12 wherein the linear alternating polymer has an LVN, measures in m-cresol at 60° C., of from about 1.8 to about 15.

14. The composition of claim 13 wherein said LVN is about 2.75 to about 4.

* * * * *